United States Patent
Kamath et al.

(10) Patent No.: US 10,902,293 B2
(45) Date of Patent: Jan. 26, 2021

(54) NEURAL ARCHITECTURE CONSTRUCTION USING ENVELOPENETS FOR IMAGE RECOGNITION

(71) Applicant: Cisco Technology, Inc., San Jose, CA (US)

(72) Inventors: Purushotham Kamath, San Jose, CA (US); Abhishek Singh, San Jose, CA (US); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 16/177,581

(22) Filed: Nov. 1, 2018

(65) Prior Publication Data

US 2019/0286945 A1  Sep. 19, 2019

Related U.S. Application Data

(60) Provisional application No. 62/643,839, filed on Mar. 16, 2018.

(51) Int. Cl.
   *G06K 9/62*  (2006.01)
   *G06N 3/08*  (2006.01)
   *G06N 3/04*  (2006.01)

(52) U.S. Cl.
   CPC .......... *G06K 9/6262* (2013.01); *G06K 9/627* (2013.01); *G06K 9/6256* (2013.01); *G06N 3/04* (2013.01); *G06N 3/082* (2013.01)

(58) Field of Classification Search
   CPC .... G06K 9/6262; G06K 9/627; G06K 9/6256; G06N 3/082; G06N 3/04
   See application file for complete search history.

(56) References Cited

U.S. PATENT DOCUMENTS

| | | | |
|---|---|---|---|
| 10,002,029 B1 | 6/2018 | Bequet et al. | |
| 10,225,607 B1 * | 3/2019 | Bai | ..................... H04N 21/251 |
| 2013/0238778 A1 | 9/2013 | Reitan | |
| 2017/0185897 A1 | 6/2017 | Droppo et al. | |

(Continued)

FOREIGN PATENT DOCUMENTS

WO   WO-2008132066 A1   11/2008

OTHER PUBLICATIONS

Kamath, et al., "Neural Architecture Construction using EnvelopeNets", arXiv:1803.06744v2, May 22, 2018, 11 pages, arXiv.org.

(Continued)

*Primary Examiner* — Leon Viet Q Nguyen
(74) *Attorney, Agent, or Firm* — Behmke Innovation Group; Kenneth J. Heywood; Jonathon P. Western

(57) ABSTRACT

In one embodiment, a device forms a neural network envelope cell that comprises a plurality of convolution-based filters in series or parallel. The device constructs a convolutional neural network by stacking copies of the envelope cell in series. The device trains, using a training dataset of images, the convolutional neural network to perform image classification by iteratively collecting variance metrics for each filter in each envelope cell, pruning filters with low variance metrics from the convolutional neural network, and appending a new copy of the envelope cell into the convolutional neural network.

20 Claims, 9 Drawing Sheets

(56) References Cited

U.S. PATENT DOCUMENTS

2017/0337471 A1* 11/2017 Kadav ............... G06K 9/00771
2018/0330235 A1* 11/2018 Lin .................... G06N 3/063

OTHER PUBLICATIONS

Sabour, et al., "Dynamic Routing Between Capsules", arXiv:1710.09829v2, Nov. 7, 2017, 11 pages, arXiv.org.
Zoph, et al., "Learning Transferable Architectures for Scalable Image Recognition", arXiv:1707.07012v4, 14 pages, Apr. 11, 2018, arXiv.org.
"CiscoAI/amla: AutoML frAmework for Neural Networks", https://github.com/ciscoai/amla, Accessed on Jul. 23, 2018, 3 pages, GitHub.com.
Zoph et al. "Neural Architecture Search with Reinforcement Learning" Feb. 15, 2017; pp. 1-16.
Zeiler et al. "Visualizing and Understanding Convolutional Networks" Nov. 28, 2013; pp. 1-11.
Szegedy et al. "Going Deeper with Convolutions" Sep. 17, 2014; pp. 1-12.
Simonyan et al. "Very Deep Convolutional Networks for Large-Scale Image Recognition" Apr. 10, 2015; pp. 1-14.
Real et al. "Large-Scale Evolution of Image Classifiers" Jun. 11, 2017; pp. 1-18.
Real et al. "Regularized Evolution for Image Classifier Architecture Search" Jun. 25, 2018; pp. 1-16.
Pham et al. "Efficient Neural Architecture Search via Parameter Sharing" Feb. 12, 2018; pp. 1-11.
Molchanov et al. "Pruning Convolutional Neural Networks for Resource Efficient Inference" Jun. 8, 2017; pp. 1-17.
Mittal et al. "Recovering from Random Pruning—On the Plasticity of Deep Convolutional Neural Networks" Jan. 31, 2018; pp. 1-10.
Liu et al. "Progressive Neural Architecture Search" Jul. 26, 2018; pp. 1-20.
Lin et al. "Network in Network" Mar. 4, 2014; pp. 1-10.
Li et al. "Pruning Filters for Efficient ConvNets" Mar. 10, 2017; pp. 1-13.
Alex Krizhevsky "Learning multiple layers of features from tiny images" Apr. 8, 2009; pp. 1-60.
Huang et al. "Densely Connected Convolutional Networks" Jan. 28, 2018; pp. 1-9.
He et al. "Deep Residual Learning for Image Recognition" Dec. 10, 2015; pp. 1-12.
Floreano et al. "Neuroevolution—from architectures to learning" Jan. 10, 2008; pp. 1-16.
Elsken et al. "Simple and Efficient Architecture Search for Convolutional Neural Networks" Nov. 13, 2017; pp. 1-14.
Francois Chollet "Xception—Deep Learning with Depthwise Separable Convolutions" Apr. 4, 2017; pp. 1-8.
Bergstra et al. "Random Search for Hyper-Parameter Optimization" Feb. 2012; pp. 1-25.
Arora et al. "Provable Bounds for Learning Some Deep" Oct. 23, 2013; pp. 1-54.
Lambda Labs "What is max pooling in convolutional neural networks?" Convolutional Neural Networks (CNN) Artificial Neural Networks Machine Learning; 2017.

* cited by examiner

NEURAL ARCHITECTURE CONSTRUCTION USING ENVELOPENETS FOR IMAGE RECOGNITION

RELATED APPLICATION

This application claims priority to U.S. Provisional Patent Appl. No. 62/643,839, filed on Mar. 16, 2018, entitled NEURAL ARCHITECTURE CONSTRUCTION USING ENVELOPENETS, by Kamath, et al., the contents of which are incorporated herein by reference.

TECHNICAL FIELD

The present disclosure relates generally to computer networks, and, more particularly, to neural architecture construction using EnvelopeNets for image recognition.

BACKGROUND

Interest in machine learning has increased considerably in recent years. From image recognition and analysis, to personal assistants, to diagnostic systems, machine learning is becoming more and more integral to many technologies. One form of machine learning that is of particular interest in the field of image recognition is the convolutional neural network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
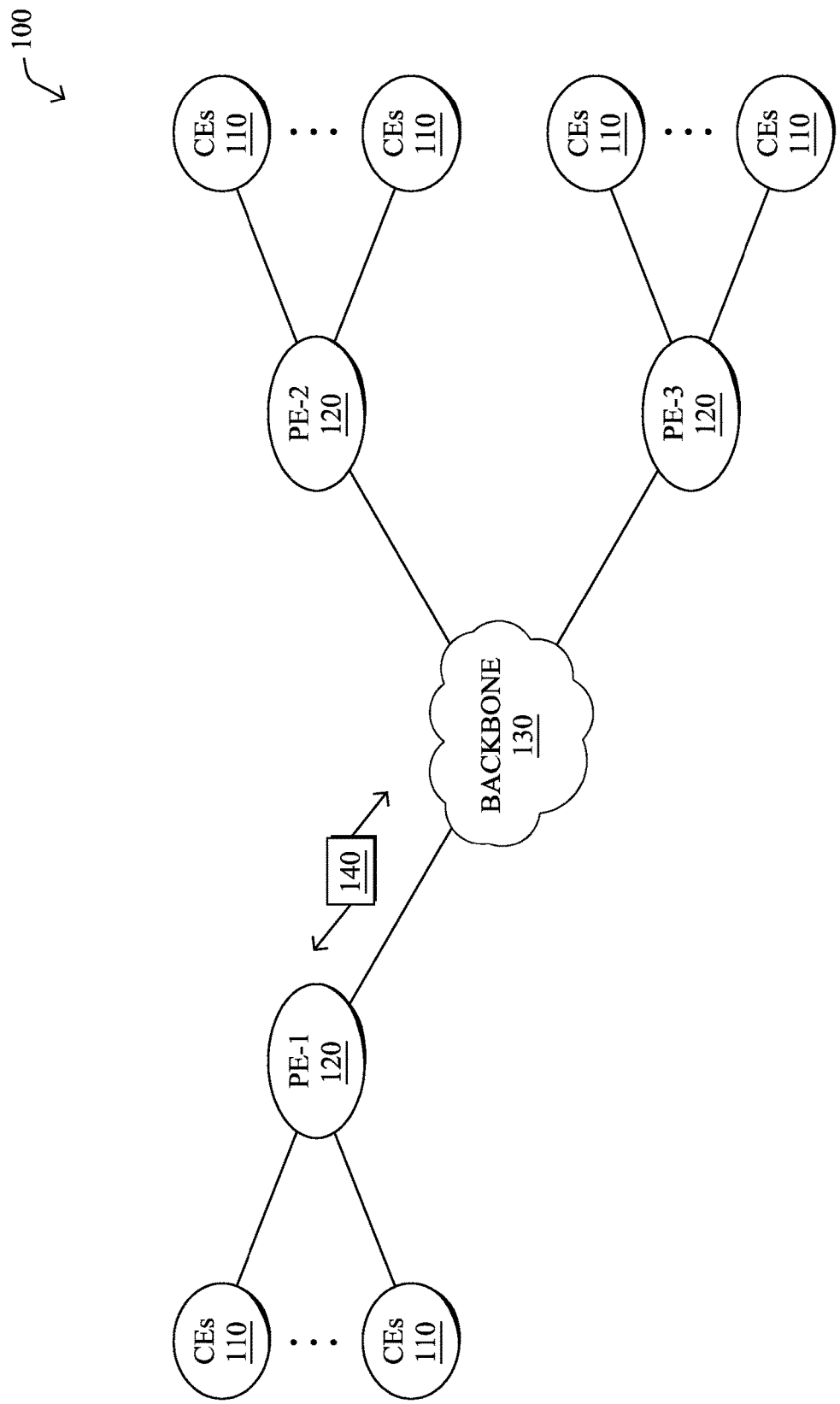
FIGS. 1A-1B illustrate an example communication network.

According to one or more embodiments of the disclosure, a device forms a neural network envelope cell that comprises a plurality of convolution-based filters in series or parallel. The device constructs a convolutional neural network by stacking copies of the envelope cell in series. The device trains, using a training dataset of images, the convolutional neural network to perform image classification by iteratively collecting variance metrics for each filter in each envelope cell, pruning filters with low variance metrics from the convolutional neural network, and appending a new copy of the envelope cell into the convolutional neural network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
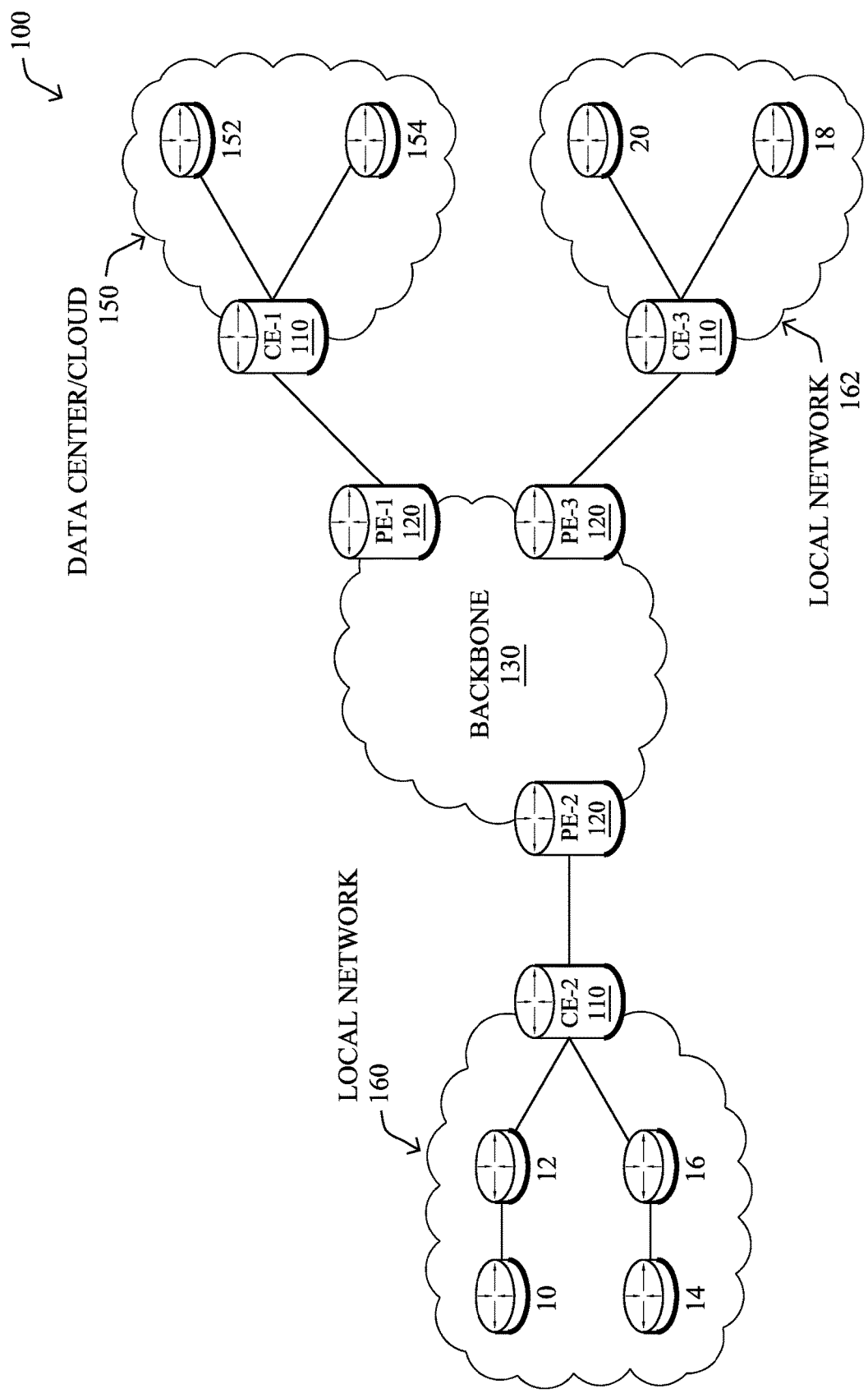

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
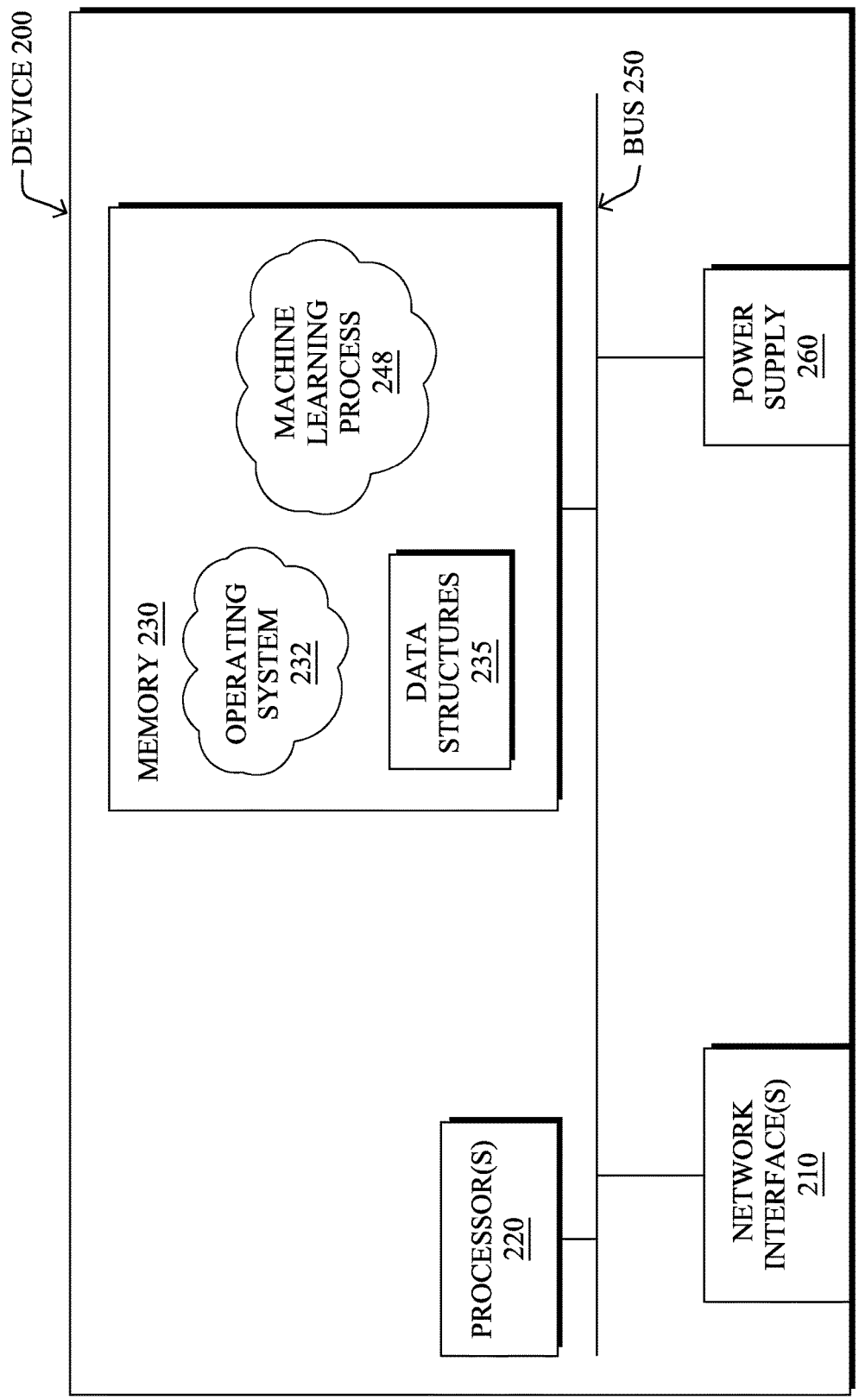
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, machine learning can be used in a variety of different technologies. For example, machine learning can be used in the field of image recognition and analysis to identify objects depicted in still images and/or video. In another example, machine learning can be used in a computer network to assess the health of the network (e.g., by classifying the operational behavior of the devices and/or network traffic, performing root-cause analysis for certain behaviors, etc.). In a further example, machine learning can be used for network security purposes, such as detecting malicious or otherwise undesired operations (e.g., traffic associated with malware, etc.).

Neural Architecture Construction Using EnvelopeNets

The techniques herein introduce a neural architecture construction using "EnvelopeNets" that constructs a neural network from a network of superset cells, referred to herein as "envelope cells," via a restructuring process. In some aspects, a superset cell can be used to construct the EnvelopeNet using this cell, which envelopes several bespoke and generated cells. This technique designs a network optimized for a training set and resource availability by selectively restructuring blocks within the cells of the EnvelopeNet based on metrics collected during a training of the EnvelopeNet.

Specifically, according to various embodiments, a device forms a neural network envelope cell that comprises a plurality of convolution-based filters in series or parallel. The device constructs a convolutional neural network by stacking copies of the envelope cell in series. The device trains, using a training dataset of images, the convolutional neural network to perform image classification by iteratively collecting variance metrics for each filter in each envelope cell, pruning filters with low variance metrics from the convolutional neural network, and appending a new copy of the envelope cell into the convolutional neural network.

Illustratively, the techniques described herein may be performed by hardware, software, and/or firmware, such as in accordance with the machine learning process 248, which may include computer executable instructions executed by the processor 220 (or independent processor of interfaces 210) to perform functions relating to the techniques described herein.

Operationally, the techniques herein propose a neural architecture construction method based on EnvelopeNets that constructs a neural network from a network of superset cells (called envelope cells) via a restructuring algorithm. In various embodiments, a superset cell is designed that envelopes several previously proposed bespoke and generated cells and construct an EnvelopeNet using this cell. In some embodiments, the method designs a network optimized for a training set and resource availability by selectively restructuring blocks within the cells of the EnvelopeNet based on metrics collected during a training of the EnvelopeNet.

According to various embodiments, EnvelopeNet-based neural network construction and training may entail stacking envelope cells, and performing filter pruning and network restructuring, to train the neural network. Note that the envelope cells introduced herein are not optimal in any way. Indeed, the techniques herein intentionally choose envelope cells to be non-optimal and over provisioned. During model training, the filter pruning and network restructuring techniques use extracted metrics from the EnvelopeNet to iteratively optimize the network. In some aspects, this may be achieved by pruning low performing filters and appending new envelope cells to the deep end of the network. In doing so, the training optimization avoids having to search over the entire space of network architectures for the optimal architecture. The network restructuring method used herein also differs from other neuroevolution methods, where single blocks/filters are added based on a mutation or an optimization technique.

To help illustrate the proposed neural network construction and training approaches introduced herein, the following terminology is used:

Block $B_i$— An operation/operator, such as a convolution (e.g., a convolution-based filter), max pool, concatenation, or the like.

Cell $C_i$—A combination of blocks in series or parallel. Such a cell may be custom built or generated, in various embodiments.

Network $N_i$—A combination of cells and/or blocks. For example, a network may consist of cells stacked in series or a directed graph of blocks.

Network Width—The number of parallel branches of a cell.

Envelope construction can be formalized as the following problem: given a network $N_e$ of depth $L_e$ built by stacking envelope cells $C_e$ (custom built or generated) in series, find the network $N_m$ from the set of all possible networks $N_i$ of depth $L_i > L_e$ that may be constructed by removing n-number of blocks of $N_e$ and adding them back in different locations, such that the accuracy Perf is maximized, subject to constraints on network complexity (e.g., number of blocks, parameters and operations M, etc.). Said differently, the goal of the pruning and network restructuring may be formalized as follows:

Find $N_m$ such that $\text{Perf}(N_m) > \text{Perf}(N_i)$, $\forall i \mid M(N_m) < M_{max}$ In general, the techniques herein are non-optimal in the sense that the resulting convolutional neural network may not actually be the most optimal out of all possible network architectures. However, as described below, the techniques herein do generate networks that exhibit better performance than the starting EnvelopeNet and arbitrarily constructed networks of the same complexity (e.g., same depth, same blocks, and approximately the same number of parameters).

As noted above, a convolutional neural network may comprise any number of cells, each of which includes one or more blocks (e.g., operations/operators). The specific blocks and cells used may differ, depending on the application. For example, FIGS. 3A-3D illustrate example cells for a convolutional neural network capable of image recognition, according to various embodiments. Generally, these cells include an initialization cell 300 in FIG. 3A, a widener cell 310 in FIG. 3B, a classification cell 320 in FIG. 3C, and an envelope cell 330 in FIG. 3D.

Figure 3A:
FIGS. 3A-3D illustrate example cells for a neural network.

Initialization cell 300 in FIG. 3A may be located at the start of the constructed convolutional neural network and may be operable to initialize the network. As shown, initialization cell 300 may comprise the following blocks: a 3×3 convolutional filter block 302, followed by a max_pool block 304, and then by another 3×3 convolutional filter block 306. As would be appreciated, convolutional filter blocks 302 and 304 may perform convolution operations, while max_pool block 304 may perform a max pool operation. In general, max pooling is a sample-based discretization process that attempts to down-sample a representation of an image. Doing so reduces the dimensionality of the image representation, thereby allowing for the binning of different regions of the image for purposes of feature analysis.

Figure 3B:
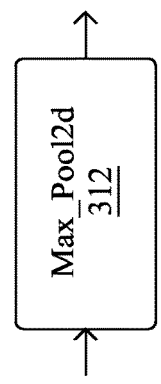

Widener cell 310 in FIG. 3B may comprise a single max_pool block 312 that reduces the image dimensions by a factor of two and doubles the channel width. In various embodiments, a copy of widener cell 310 may be placed at regular intervals, also referred to as a widening factor, in the neural network. For example, widener cell 310 may be placed in the neural network after every fourth cell, using a widening factor equal to four.

Figure 3C:
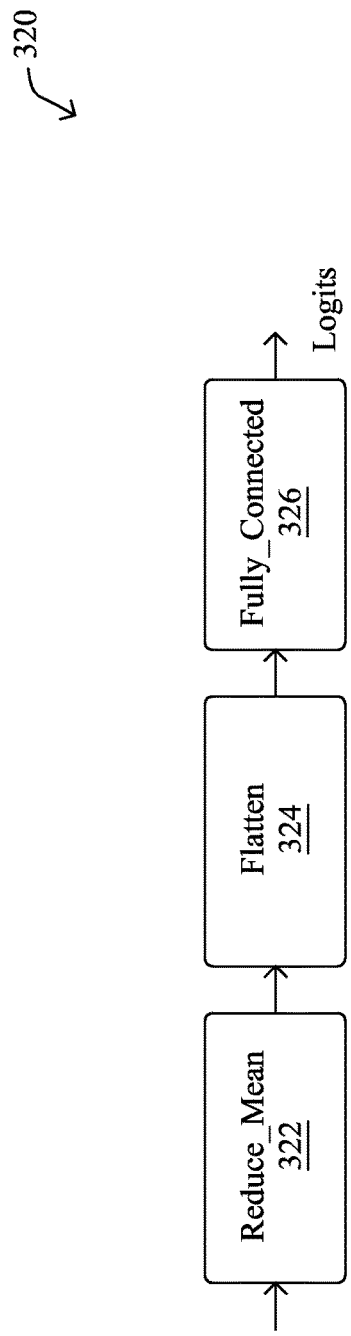

Classification cell 320 in FIG. 3C may comprise the following blocks in series: a reduce_mean block 322, a flatten block 324, and a fully_connected block 326. In general, reduce_mean block 322 may be operable to perform an average pooling operation on the representation of the image. Similar to max pooling, average pooling may perform a dimensionality reduction on the representation of the image but, as opposed to max pooling whereby the maximum of each bin is taken, average pooling takes an average of each pixel space. In general, classification cell 320 may be placed at the tail end of the neural network. In addition, no dropout may be applied during construction of the initial neural network. Notably, during experimentation, it was observed that dropout actually increases the amount of time needed for the variance metrics to stabilize. Thus, dropout may be disabled, in some embodiments.

Figure 3D:
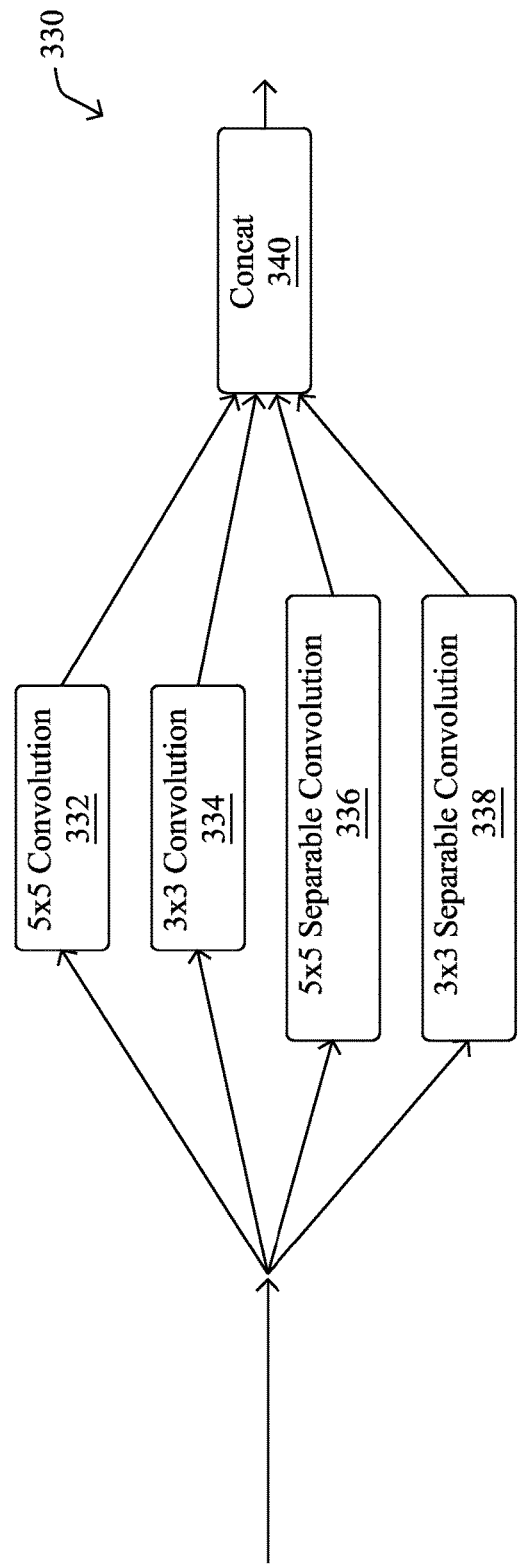

Envelope cell 330 in FIG. 3D may be formed using the following blocks connected in parallel: a 5×5 convolutional filter block 332, a 3×3 convolutional filter block 334, a 5×5 separable convolutional filter block 336, and a 3×3 separable convolutional filter block 338. Each of blocks 332-338 may comprise a convolution unit, a Relu unit, and a batch normalization unit, in some cases. As shown, envelope cell 330 may also include a concatenation block 340 that concatenates the outputs of blocks 332-338, to form the final output of envelope cell 330. As would be appreciated, envelope cell 330 represents one possible envelope cell configuration and the techniques herein can be used to form any number of different envelope cells with different blocks and/or layouts (e.g., series or parallel), as desired.

According to various embodiments, the machine learning process may form an EnvelopeNet by stacking a number of envelope cells in series. The complete neural network can then be formed by placing an initialization cell and classification cell at the head and tail of the EnvelopeNet, respectively. Widener cells may be placed at cell intervals within the neural network, according to the specified widener interval. Once the system has constructed the initial neural network, the system may train the network by iteratively measuring metrics for each of the filters in the network, pruning the low performing filters from the network based on their metrics, subject to certain constraints, and appending a new envelope cell into the network.

A number of different metrics may be measured and used for purposes of pruning filters from the constructed neural network. These metrics may include, but are not limited to, the mean activation, $l_1$ norm, entropy or activations and scaled entropy. In a further embodiment, the machine learning process may prune, at each iteration of the training, the x-number of filters that have the least variance in their featuremaps, computed over a suitably large training dataset. The reasoning for this is that, after a reasonable amount of training is complete, filters generally identify the scale of the features which they extract. In this state, filters which have consistently low variance in the distribution of their output featuremap over the training, are contributing comparatively less to the output of the classifier. Such filters are candidate filters for pruning, and may be substituted by other filters at locations where they may contribute to more information extraction. In other words, the underlying approach attempts to move a low performing filter in the neural networks to a different layer placement where the filter can contribute more to the classification task.

According to various embodiments, rather than simply rearranging the locations of poor performing filters in the neural network, the techniques herein instead propose appending another copy of the envelope cell to the tail of the network. Thus, at each iteration of the training, the learning process may remove the x-number of lowest performing filters and append a new envelope cell onto the deep end of the network. Doing so both narrows and deepens the neural network, while maintaining the overall network parameter count.

Said differently, the machine learning process may construct and train a convolutional neural network by performing any or all of the following steps:

1. Form an envelope cell using several operations/blocks, such as filters, samplers, etc., either in series or parallel. The envelope cell should be constructed to form an envelope around the cell architectures used.
2. Stack envelope cells to form an EnvelopeNet.
3. Train the EnvelopeNet and collect performance metrics (e.g., variance metrics) for each of the blocks. Sort the blocks in order of performance metrics.
4. Stop the training once the statistics have stabilized and remove the n-number of worst performing blocks from the network. Add n-number of new blocks, in an envelope cell, to the network (e.g., at the tail end of the network).
5. Repeat training on the network.
6. Iterate through steps 4 and 5 until the network reaches a predefined, desired depth.

In greater detail, pseudocode for the techniques herein is as following, in one embodiment:

```
Function main EnvelopeNetwork
    iterations ← 0
    network ← EnvelopeNetwork
    while iterations < restructureiterations do
        //Filter stats are featuremap variances indexed by filter and layer
        filterstats ← train(network)
        evaluate (network)
        network ← construct (network , filterstats)
        iterations ← iterations + 1
    end
end
```

-continued

```
Function construct network, filterstats
    //Get cells/layer in order of variance
    sorted filters ← sort(filterstats)
    restructure filters ← [ ]
    filtercount ← get filtercount(network)
    for cell c in sortedfilters do
        layer ← layer(cell)
        if restructurefiltercount(layer) + 1 > filtercount(layer)
        then
            //Do not prune a cell if it is the last cell in the layer
            continue
        else
            restructurefilters.add(cell)
            if length(restructuredfilters) > maxrestructuring
            then
                //Limit restructured filters to 4 or other desired threshold
                break
            else
        end
    end
    //Remove pruned filters and add envelopecell to end
    //Add necessary wideners
    removefilters(arch, prunedfilters)
    addcell(arch, envelopecell)
end
```

Figure 4A:
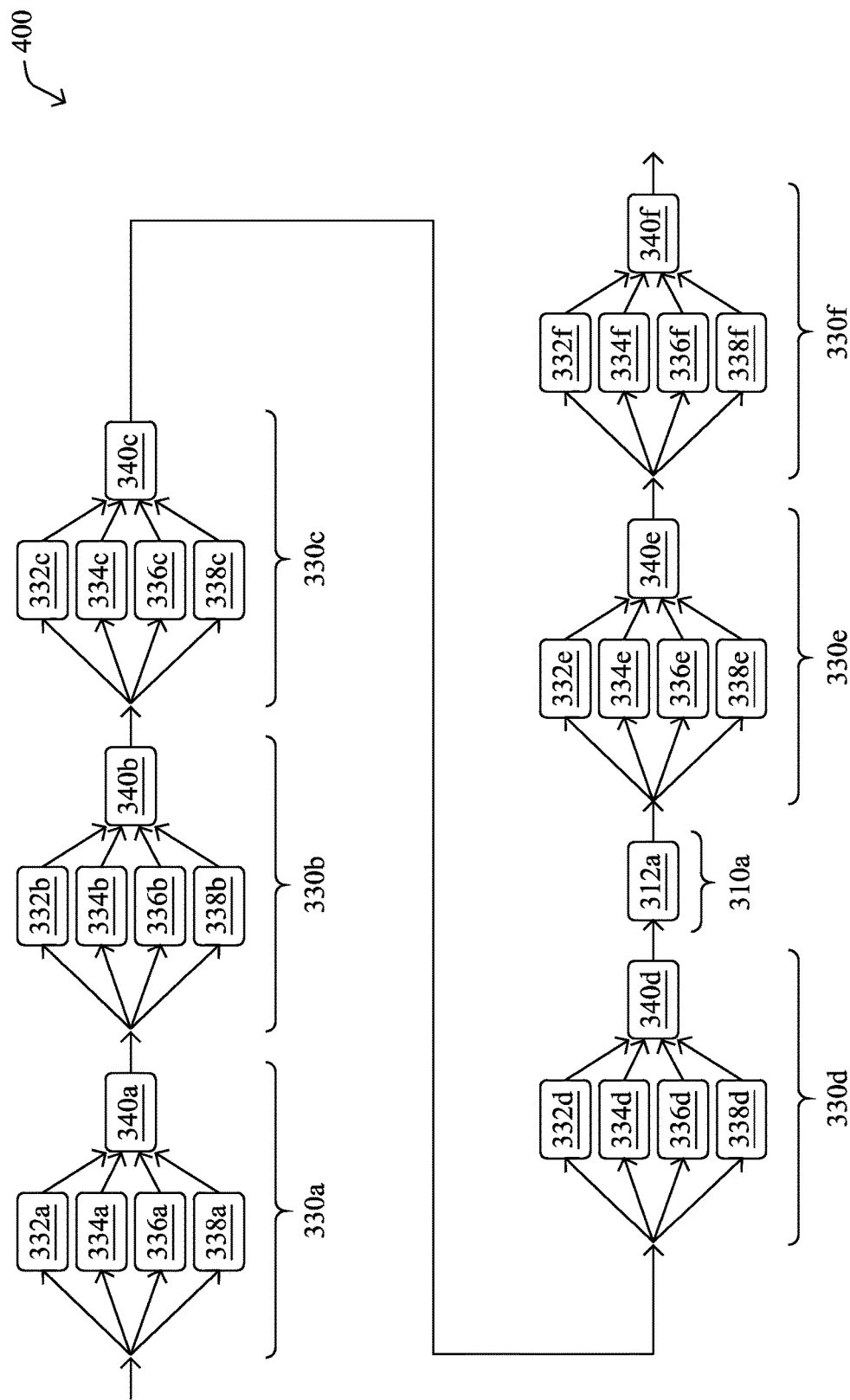
FIGS. 4A-4B illustrate the construction and training of a neural network.
Figure 4B:
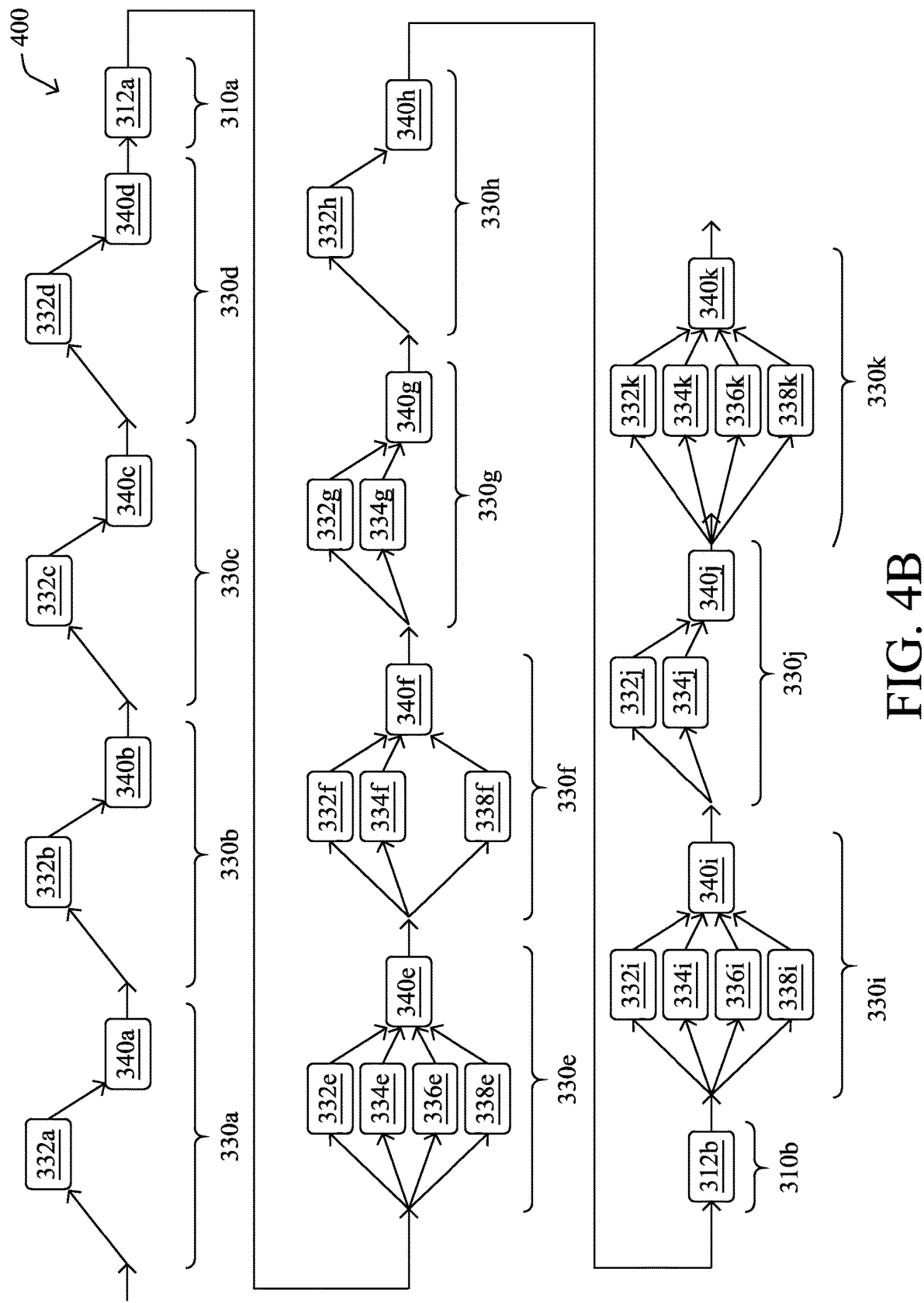

FIGS. 4A-4B illustrate the construction and training of a neural network in accordance with the teachings herein, in various embodiments. As shown in FIG. 4A, the learning process may construct an initial EnvelopeNet 400 that is six layers deep. Notably, EnvelopeNet 400 includes six copies of envelope cell 330 described previously with respect to FIG. 3D, namely envelope cells 330a-330f. Each of envelope cells 330a-330f include copies of blocks 330-338 (e.g., convolution filter blocks) in parallel, as well as a concatenation block 340 that concatenates the outputs of blocks 330-338. Also as shown, assume that a widening factor of 4 is in use. Accordingly, a copy of widener cell 310 separates envelope cells 330d and 330e, the fourth and fifth envelope cells in EnvelopeNet 400. EnvelopeNet 400 may be referred to as a 6×4-N network, as it includes six copies of envelope cell 330, each of which is four blocks deep. In this convention, 'N' denotes the number of iterations that will be used to form the finalized network.

Once the initial EnvelopeNet 400 is constructed, the machine learning process may train EnvelopeNet 400 using a training dataset of images. During this training, the process may capture statistics from the featuremaps at the outputs of the convolution filter blocks 332-338 in envelope cells 330a-330f. For example, the machine learning process may compute a running variance of the featuremap elements from the captured metrics and use this to compute an average variance for each filter block 332-338.

After computing the average variance for each filter block 332-338, the machine learning process may prune the worst performing filter blocks from EnvelopeNet 400. For example, the machine learning process may sort the average variance metrics of the filter blocks 332-338 and identify the n-number of blocks with the lowest variance metrics. In turn, the machine learning process may prune out these identified blocks 332-338 from EnvelopeNet 400. In some embodiments, the machine learning process may impose a constraint during the pruning that each envelope cell 330 must still include at least one filter block.

During each iteration of training, in addition to performing filter block filtering, the machine learning process may also append a new copy of envelope cell 330 to EnvelopeNet 400. For example, the process may append a new copy of envelope cell 330 onto the deepest end of EnvelopeNet 400.

In some embodiments, if a widening factor is specified, the process may also add in a widener cell 310 at the specified cell intervals. The machine learning process may repeat the variance metric gathering, pruning, and envelope cell appending steps, until a predefined number of iterations is reached.

FIG. 4B illustrates an example of EnvelopeNet 400 after five iterations of processing. As a result of the five rounds of iteration, envelope cells 330g-330k were appended onto EnvelopeNet 400, as well as widener cell 310b, based on a widening factor of 4. During the iterations, certain filter blocks 332-338 were also pruned from EnvelopeNet 400. For example, convolution filter blocks 334a-338a were pruned from envelope cell 330a. By constraint, envelope cell 330a may be required to have at least one filter block, thereby leaving filter block 332a as the sole filter block left in this cell. The machine learning process may also perform similar pruning of envelope cells 330b-330k, pruning out the filter blocks with the lowest average variance metrics per iteration. As a result of the iterations, EnvelopeNet 400 is now an eleven layer deep network. As would be appreciated, EnvelopeNet 400 is shown, but the full convolutional neural network will also include a leading initialization cell 300 and a classification cell 320 on the tail end.

To test the efficacy of the techniques herein, two experiments were conducted: an analysis of the metric chosen to select the filter blocks to be pruned during the restructuring process and an analysis of the performance of the restructured network with ablation. The experiments covered both the construction of the network and the evaluation of the EnvelopeNet and generated network. Training was performed using the CIFAR-10 dataset of images. Both construction and evaluation of the generated networks used a common set of hyperparameters which were kept constant for all runs. The training used preprocessing techniques such as random cropping, varying brightness and contrast. The optimization was RMSProp with momentum=0.9, learning rate=0.01, and an exponential decay of 0.94 per 2 epochs. A weight decay with a factor of $4 \times 10^{-5}$ was also used. The batch size was set to 50 for all experiments. No hyperparameter tuning was done on the EnvelopeNet or the generated networks. The number of restructuring iterations restructureiterations was set to 5, the number of training steps for the restructuring algorithm was set to 30,000, and the number of filters to be pruned per iteration was set to maxrestructure=4. Training and evaluation of the based and generated networks ran for 30-70,000 training steps on an NVIDIA GeForce GTX 980/1080 GPU systems on bare metal and on NVIDIA K80 GPU systems running TensorFlow version 1.5.0.

For purposes of testing, the restructuring metric chosen was the variance of the featuremaps at the output of the filters. The size of all featuremaps at a given layer was the same, allowing the variance of featuremaps at different filters to be compared. However, to compare the metric across layers, the per-filter variance needed to be averaged per element of the featuremap. At every training step, the machine learning process collected the counts and sums from the featuremap at the output of every filter. the machine learning process then used the counts to calculate a running variance of each element of the featuremap on a per filter basis. The per-filter, per-element variance was obtained by averaging over the elements of the featuremap.

As a result of the testing, it was demonstrated that the variances are relatively constant after 30,000 training iterations, allowing the machine learning process to sort the filters and identify filters for pruning. Note that the variance stabilization at 30,000 iterations, also referred to as the variance stabilization time, is substantially lower than the number of iterations required to fully train the network (e.g., approximately 100,000 iterations).

The variance results above show that the variance metrics of the filter blocks in the network have stabilized after approximately 30,000 iterations, allowing for the selection of the filter to be restructured fairly quickly. The total time for the machine learning process to run N iterations is N times the variance stabilization time. This compares favorably with both evolutionary methods, where the run time is a function of the total number of possible block combinations for a network, and cell search methods where the search time is a function of the total number of possible block combinations for a cell. At each iteration, the machine learning process may check the accuracy of the resulting network, to verify that it exceeds the accuracy of the previous network. If the accuracy drops, the iteration may terminate. However, during experimentation, it was found that the accuracy increased with each iteration and no premature iterations were observed.

Table 1 below illustrates the number of filters for each layer, the parameters and flops for the 6×4 EnvelopeNet, and the generated network (6×4-5) formed during testing. Table 1 below also shows the parameters for an "arbitrary" network, namely, a network with the same depth and number of filters as the resulting 6×4-5 network, with an arbitrarily chosen structure, referred to as the 6×4-5-Random network (or the arbitrary net).

TABLE 1

| Network | Number of filters in each layer | Parameters | Operations (flops) |
|---|---|---|---|
| 6 × 4 | 4, 4, 4, 4, 4, 4 | 12.18M | 7.82 B |
| 6 × 4-5 | 1, 1, 1, 1, 4, 3, 2, 1, 4, 2, 4 | 16.91M | 18.65 B |
| 6 × 4-5-Random | 4, 4, 4, 2, 1, 1, 2, 2, 1, 2, 1 | 16.41M | 14.47 B |

Figure 5:
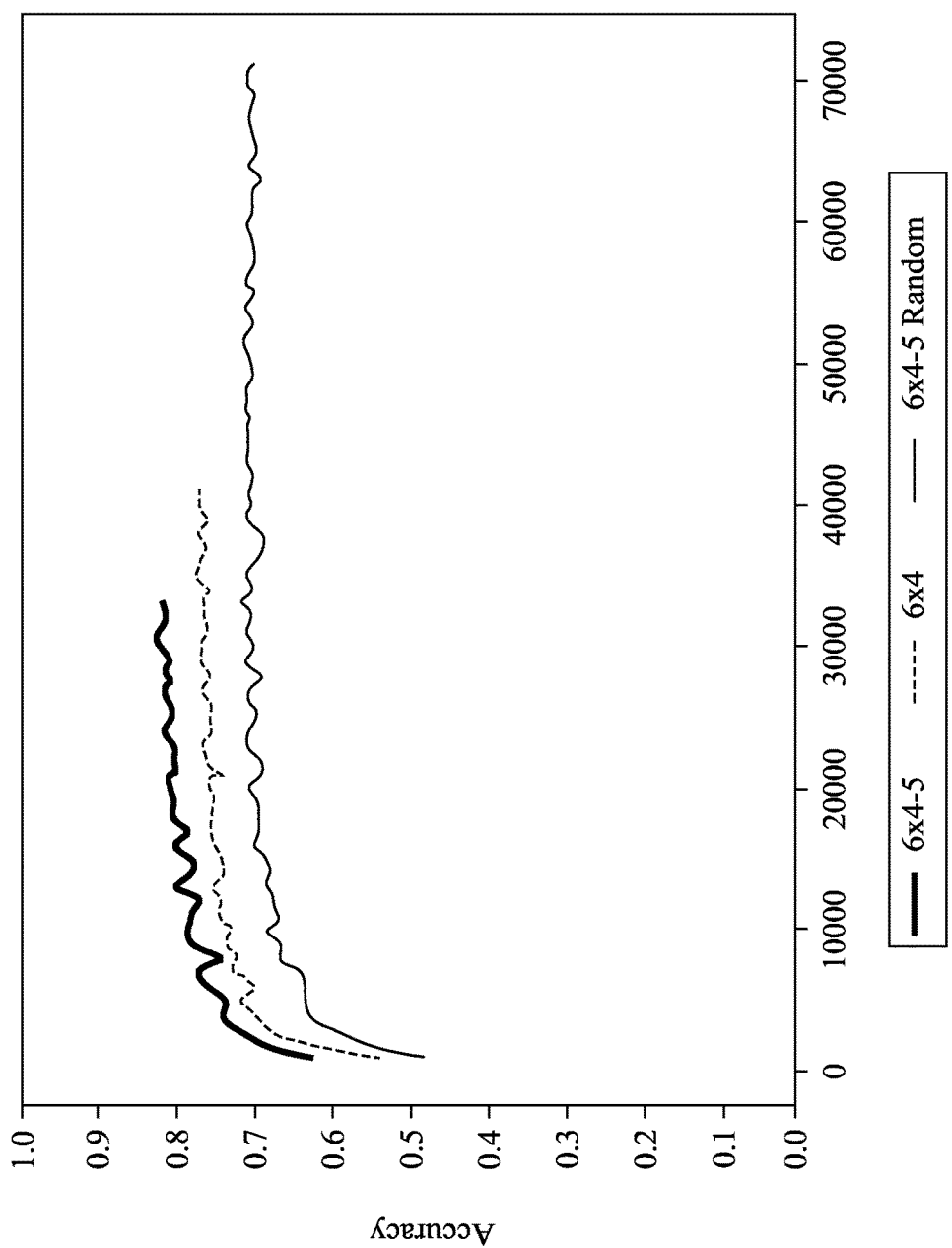
FIG. 5 illustrates an example plot of accuracy test results using the techniques herein.

FIG. 5 illustrates an example plot 500 of accuracy test results using the techniques herein. As shown, the accuracies of convolutional neural networks were tested for the initial 6×4 EnvelopeNet, the resulting 6×4-5 generated network after five iterations of training/network rearrangement, and for a 6×4-5-Random network with an arbitrarily selected architecture. The CIFAR-10 dataset was then used to test the accuracy of each neural network, with plot 500 showing the resulting image recognition task accuracies vs. number of training iterations used to train the networks.

From plot 500, it can be seen that the 6×5-5 restructured neural network outperforms the neural network based on the initial 6×4 EnvelopeNet by a fair amount. The performance of the arbitrary network was also better than that of the 6×4 EnvelopeNet-based network, but still lower than the network generated using the techniques herein. This ablation result indicates that structure of the generated network is responsible for some of the gain, and that the entire gains do not come from deepening the network.

Figure 6:
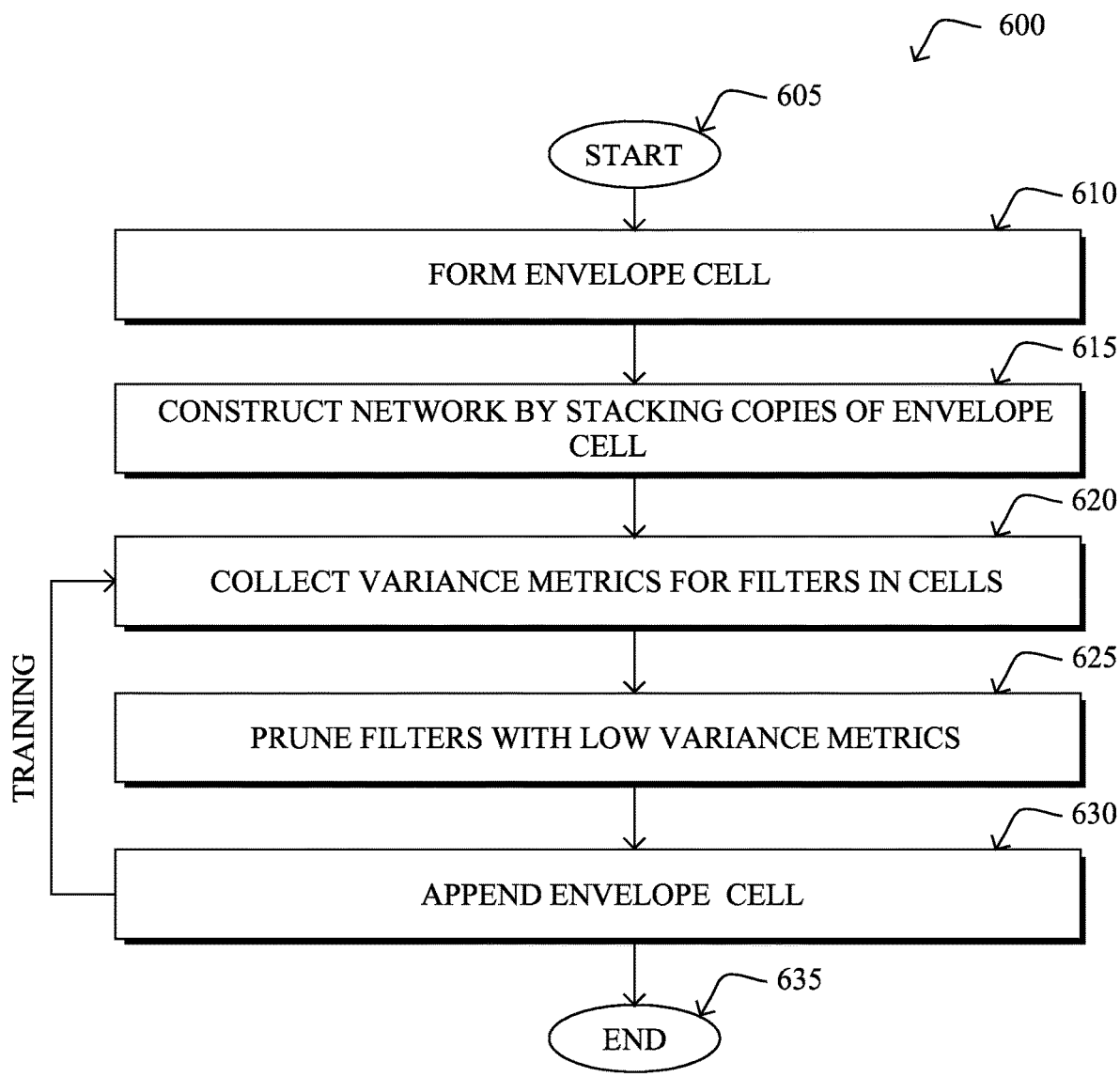
FIG. 6 illustrates an example simplified procedure for training a neural network using envelope cells.

FIG. 6 illustrates an example simplified procedure 600 for training a neural network using envelope cells, in accordance with one or more embodiments described herein. For example, a non-generic, specifically configured device (e.g., device 200) may perform procedure 600 by executing stored instructions (e.g., process 248) to implement a machine learning process configured to generate a convolutional neural network capable of performing image recognition/classification. The procedure 600 may start at step 605, and continues to step 610, where, as described in greater detail above, the device may form a neural network envelope cell that comprises a plurality of convolution-based filters in series or parallel. In general, as noted above, such an envelope cell may include any number of operations/blocks that act as a superset of operations/blocks to be applied. In the specific task of image classification, such blocks may include convolutional filters. However, other operations/blocks can be used in an envelope cell, in further embodiments.

At step 615, as detailed above, the device may a construct convolutional neural network by stacking copies of the envelope cell in series. Such a series of envelope cells is also referred to as an EnvelopeNet. In some embodiments, a widener cell may be placed in the network after a specified number of envelope cells.

According to various embodiments, the device may restructure the neural network constructed in step 615 by iteratively training the network using a training dataset of images, or other training dataset, if the network is to perform a different type of classification. In various embodiments, the device may perform these iterations a set number of times, to produce a finalized convolutional neural network of a desired depth. For example, five iterations on an initial network of depth six will result in a network of depth eleven. In general, as shown, these iterative steps may include steps 620-630.

At step 620, the device may collect variance metrics for each filter in each envelope cell of the neural network, during each iteration, as described in greater detail above. Notably, during each iteration, the device may train the network using a predefined number of training steps and, in turn, measure the variances of the featuremaps of the filters in the neural network. Such variance metrics may be an average of the featuremap variances, in some cases. As would be appreciated, other metrics may be collected and used, in further embodiments.

At step 625, as detailed above, the device may also prune filters with low variance metrics from the convolutional neural network. For example, during each iteration, the device may prune the n-number of filters in the network with the lowest average variances. In some embodiments, the device may also impose a constraint on the pruning that at least one (or more than one) filters remain in each envelope cell in the network.

At step 630, the device may append a new copy of the envelope cell into the convolutional neural network, as described in greater detail above. Notably, during each iteration, the device may add a new copy of the envelope cell from step 610 to the deep end of the network. In doing so, new filters are added back into the network at a different location, to replace those pruned in step 625.

Once the device has performed the specified number of iterations of steps 620-630, procedure continues on to step 635 and ends. As a result of the iterations, the resulting neural network will perform its classification task (e.g., image recognition) with higher accuracy than that of the network initially constructed in step 615 using the copies of the envelope cells.

The techniques described herein, therefore, introduce a neural architecture construction approach using EnvelopeNets that constructs a neural network from a network of superset cells, called envelope cells, via a restructuring process. Analysis of these techniques shows that this approach can identify blocks to be restructured with less computation resources than required for the envelope network to be trained to maximum accuracy. In addition, the disclosed techniques can identify a network architecture with less compute resources than search based construction approaches.

While there have been shown and described illustrative embodiments that provide for performing machine learning using EnvelopeNets, it is to be understood that various other adaptations and modifications may be made within the spirit and scope of the embodiments herein. For example, while certain embodiments are described herein with respect to using machine learning models for certain tasks, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   forming, by a device, a neural network envelope cell that comprises a plurality of convolution-based filters in series or parallel;
   constructing, by the device, a convolutional neural network by stacking copies of the envelope cell in series; and
   training, by the device and using a training dataset of images, the convolutional neural network to perform image classification by iteratively:
   collecting variance metrics for each filter in each envelope cell;
   pruning filters with low variance metrics from the convolutional neural network; and
   appending a new copy of the envelope cell into the convolutional neural network such that at least one new copy of the envelope cell is appended to a deepest end of the convolutional neural network during each iteration of the training.

2. The method as in claim 1, further comprising:
   using the trained convolutional neural network to classify an image.

3. The method as in claim 1, wherein the envelope cell comprises a plurality of different convolution-based filters in parallel and a concatenation operator that concatenates outputs of the parallel convolution-based filters.

4. The method as in claim 1, wherein pruning the filters with low variance metrics from the convolutional neural network comprises:
   ensuring that at least one filter remains unpruned from each envelope cell.

5. The method as in claim 1, wherein constructing the convolutional neural network by stacking copies of the envelope cell in series comprises:
   adding a maxpool operator in series in the convolutional neural network after a predefined number of envelope cells.

6. The method as in claim 1, further comprising:
   ending the training of the convolutional neural network after a threshold number of iterations.

7. The method as in claim 1, wherein pruning the filters with low variance metrics from the convolutional neural network comprises:
   pruning a set number of filters with the lowest variance metrics from the convolutional neural network during each iteration of the training.

8. An apparatus, comprising:
   one or more network interfaces to communicate with a network;
   a processor coupled to the network interfaces and configured to execute one or more processes; and
   a memory configured to store a process executable by the processor, the process when executed configured to:
   form a neural network envelope cell that comprises a plurality of convolution-based filters in series or parallel;
   construct a convolutional neural network by stacking copies of the envelope cell in series; and
   train, using a training dataset of images, the convolutional neural network to perform image classification by iteratively:
   collecting variance metrics for each filter in each envelope cell;
   pruning filters with low variance metrics from the convolutional neural network; and
   appending a new copy of the envelope cell into the convolutional neural network such that at least one new copy of the envelope cell is appended to a deepest end of the convolutional neural network during each iteration of the training.

9. The apparatus as in claim 8, wherein the process when executed is further configured to:
   use the trained convolutional neural network to classify an image.

10. The apparatus as in claim 8, wherein the envelope cell comprises a plurality of different convolution-based filters in parallel and a concatenation operator that concatenates outputs of the parallel convolution-based filters.

11. The apparatus as in claim 8, wherein the apparatus prunes the filters with low variance metrics from the convolutional neural network by:
   ensuring that at least one filter remains unpruned from each envelope cell.

12. The method as in claim 1, wherein the apparatus constructs the convolutional neural network by stacking copies of the envelope cell in series by:
   adding a maxpool operator in series in the convolutional neural network after a predefined number of envelope cells.

13. The apparatus as in claim 8, wherein the process when executed is further configured to:
   ending the training of the convolutional neural network after a threshold number of iterations.

14. The apparatus as in claim 8, wherein the apparatus prunes the filters with low variance metrics from the convolutional neural network by:
   pruning a set number of filters with the lowest variance metrics from the convolutional neural network during each iteration of the training.

15. A tangible, non-transitory, computer-readable medium storing program instructions that cause a device to execute a process comprising:
- forming, by the device, a neural network envelope cell that comprises a plurality of convolution-based filters in series or parallel;
- constructing, by the device, a convolutional neural network by stacking copies of the envelope cell in series; and
- training, by the device and using a training dataset of images, the convolutional neural network to perform image classification by iteratively:
  - collecting variance metrics for each filter in each envelope cell;
  - pruning filters with low variance metrics from the convolutional neural network; and
  - appending a new copy of the envelope cell into the convolutional neural network such that at least one new copy of the envelope cell is appended to a deepest end of the convolutional neural network during each iteration of the training.

16. The computer-readable medium as in claim 15, wherein the process further comprises:
- using the trained convolutional neural network to classify an image.

17. The computer-readable medium as in claim 15, wherein the envelope cell comprises a plurality of different convolution-based filters in parallel and a concatenation operator that concatenates outputs of the parallel convolution-based filters.

18. The computer-readable medium as in claim 15, wherein pruning the filters with low variance metrics from the convolutional neural network comprises:
- ensuring that at least one filter remains unpruned from each envelope cell.

19. The computer-readable medium as in claim 15, wherein constructing the convolutional neural network by stacking copies of the envelope cell in series comprises:
- adding a maxpool operator in series in the convolutional neural network after a predefined number of envelope cells.

20. The computer-readable medium as in claim 15, wherein pruning the filters with low variance metrics from the convolutional neural network comprises:
- pruning a set number of filters with the lowest variance metrics from the convolutional neural network during each iteration of the training.

* * * * *